No. 608,039. Patented July 26, 1898.
W. GRISCOM.
SCRAPER FOR SIEVES.
(Application filed Nov. 5, 1897.)
(No Model.)
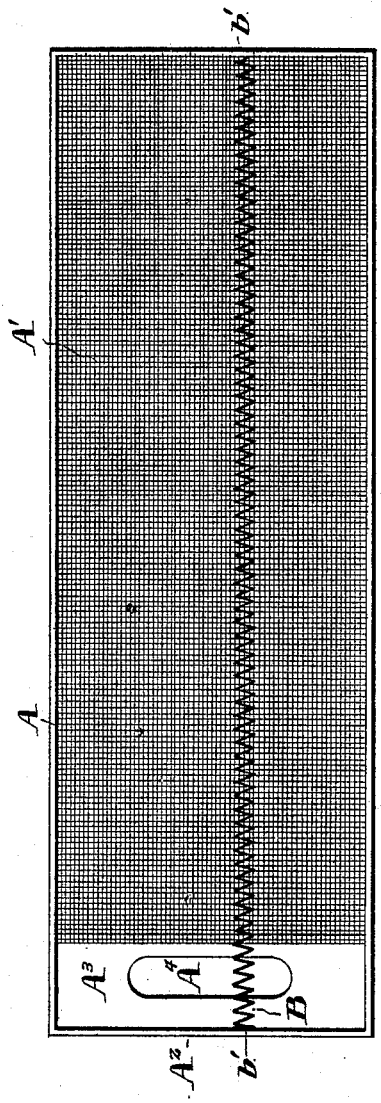
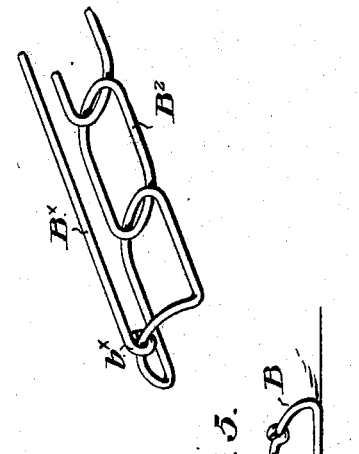
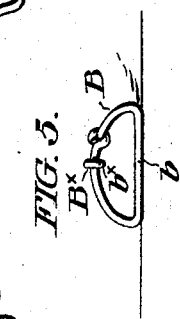
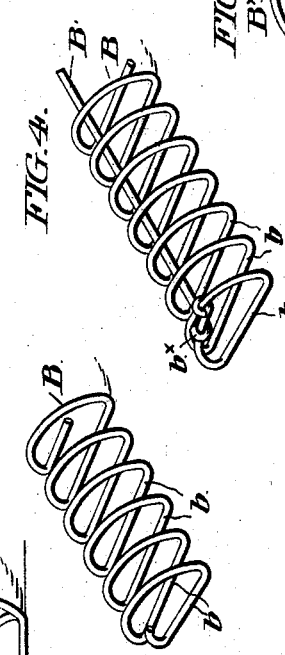
WITNESSES:
Clifton C. Hallowell
E. L. Fullerton.
INVENTOR:
Walter Griscom,
By, A. E. Paige
Atty.

UNITED STATES PATENT OFFICE.

WALTER GRISCOM, OF PHILADELPHIA, PENNSYLVANIA.

SCRAPER FOR SIEVES.

SPECIFICATION forming part of Letters Patent No. 608,039, dated July 26, 1898.

Application filed November 5, 1897. Serial No. 657,474. (No model.)

*To all whom it may concern:*

Be it known that I, WALTER GRISCOM, of Philadelphia, in the State of Pennsylvania, have invented certain new and useful Improvements in Scrapers for Sieves, whereof the following is a specification, reference being had to the accompanying drawings.

My invention is particularly applicable to the class of sieves used in what are known as "scalpers," "purifiers," "separators," &c., the same being devices wherein the coarser particles are separated from granulated material, such as flour, by passing said material through one or more sieves, to which motion is imparted during the operation. It has been found in practice that in devices of this class the meshes of the bolting-cloth or similar material forming the sieve quickly become clogged with particles of material, necessitating some means for removing the same.

It is the object of my invention to provide a scraping implement separate from the sieve structure and adapted to automatically traverse the surface of the sieve during the operative movement of the latter, said movement being imparted to the implement aforesaid by frictional contact with the sieve or with the material being sifted.

In the accompanying drawings, Figure 1 is a plan view of a typical sieve structure such as is ordinarily used in devices of the character above set forth, a convenient embodiment of my invention being shown as applied thereto. Fig. 2 is a perspective view of a fragment of the implement shown in plan in Fig. 1. Fig. 3 shows in elevation the terminal loop of said implement. Fig. 4 is a perspective view of a modified form of my invention. Fig. 5 is an end elevation of the form of my invention shown in Fig. 4. Fig. 6 is a perspective view of a modified form of my invention.

Referring to Fig. 1, A is the sieve, which is mounted upon a frame comprising side bars A' A', end bars $A^2 A^2$, and a solid bottom $A^3$ at one end of sufficient extent to embody a discharge-opening $A^4$ for the tailings from the sieve. In practice such a sieve-frame is mounted in a framework or casing so as to incline slightly downward toward the discharge-opening $A^4$, the material to be sifted being dropped upon the sieve A at its extremity opposite to said discharge-opening, means being also provided to vibrate said sieve. That portion of said material having coarser particles than the meshes of the sieve A gradually gravitates toward and falls through the discharge-opening $A^4$ as tailings from said sieve, the finer particles of material which fall through the meshes of said sieve being otherwise disposed of.

The form of my invention shown in Figs. 1 and 2 consists of a spiral B, formed of wire, preferably having the outline shown in end elevation in Fig. 5—*i. e.*, the lower portion of it being flattened and the upper portion curved throughout the length of the spiral. The convolutions of the spiral, being thus flattened throughout its length, form a series of scraping edges $b$ for contact with the sieve-surface. Said implement B may be of less length than that indicated in Fig. 1, so as to shift longitudinally with respect to the sieve; but I prefer to make it of such length as to have a slight frictional contact upon the opposite ends of the sieve-frame, and thus limit it to transverse movement with respect to the sieve when the latter has the usual gyratory motion.

To prevent displacement of the latter form of my invention, I prefer to provide each end thereof with a contact-piece of greater width than its body. This piece may be conveniently formed by the terminal loop $b'$, integral with the body spiral.

It is desirable for sieves of extremely fine texture to make the scraping implement B relatively light in weight.

In Figs. 4 and 5 I have shown a modification of my invention wherein wire of slight diameter may be used to form the main body B of the scraping implement and said body be stiffened by means of a resilient rod $B^\times$, extending longitudinally of said main body and secured thereto at its extremities $b^\times$. In said form of my invention the stiffening-rod $B^\times$ is conveniently extended within the coil forming the main body B. It is not essential, however, that said rod be thus located. Said body may be formed as indicated at $B^2$ in Fig. 6 and the rod $B^\times$ extended from end to end thereof, as indicated in said figure.

I am aware that it is not new to use a chain of the ordinary link form for the purpose described. However, in operation a chain which is not provided with means to maintain it in its extended form quickly settles in a coil and is thereafter practically useless for the purpose intended.

I am also aware that it is not new to secure a chain at its extremities upon the sieve-frame, and thus prevent its coiling, as described. It is obvious, however, that the chain thus confined upon the sieve-frame is necessarily limited in its movement, so that some portion of the sieve, such as the corners, remain untouched by the chain in its operation.

I believe it to be broadly new to provide a scraping implement for the purpose described which has a flexible body adapted to maintain its extended form without attachment upon the sieve-frame. I therefore do not desire to limit myself to the precise construction of my invention which I have shown and described.

I claim—

1. The combination with a sieve, of a wire helix arranged on the inner surface of the sieve, the ends of said helix being in frictional contact with opposite portions of the sieve-frame, substantially as and for the purpose set forth.

2. An implement for the purpose described, comprising a helix of wire, and a flexible rod secured to said helix in longitudinal relation therewith, substantially as set forth.

3. The combination with a sieve, of a helix of wire, having a flattened side, the arrangement of the parts being such that the flattened side of said helix is caused to scrape the surface of said sieve, by the movement of the sieve, substantially as set forth.

WALTER GRISCOM.

Witnesses:
C. H. EIMERMAN,
A. E. PAIGE.